(12) United States Patent
Patavardhan et al.

(10) Patent No.: US 10,817,545 B2
(45) Date of Patent: Oct. 27, 2020

(54) COGNITIVE DECISION SYSTEM FOR SECURITY AND LOG ANALYSIS USING ASSOCIATIVE MEMORY MAPPING IN GRAPH DATABASE

(71) Applicant: Accenture Global Solutions Limited, Dublin (IE)

(72) Inventors: Sudhir Ranganna Patavardhan, Bangalore (IN); Nikhil S. Tanwar, London (GB)

(73) Assignee: Accenture Global Solutions Limited, Dublin (IE)

( * ) Notice: Subject to any disclaimer, the term of this patent is extended or adjusted under 35 U.S.C. 154(b) by 211 days.

(21) Appl. No.: 16/119,461

(22) Filed: Aug. 31, 2018

(65) Prior Publication Data
US 2019/0171756 A1 Jun. 6, 2019

(30) Foreign Application Priority Data
Dec. 4, 2017 (IN) .............................. 201711043445

(51) Int. Cl.
*G06F 17/30* (2006.01)
*G06F 16/28* (2019.01)
(Continued)

(52) U.S. Cl.
CPC ........ *G06F 16/288* (2019.01); *G06F 16/2379* (2019.01); *G06F 16/3344* (2019.01);
(Continued)

(58) Field of Classification Search
None
See application file for complete search history.

(56) References Cited

U.S. PATENT DOCUMENTS 7,082,492 B2 * 7/2006 Pullela .............. G06F 16/90339
711/108
9,785,564 B2 * 10/2017 Venkata .............. G06F 12/0873
(Continued)

FOREIGN PATENT DOCUMENTS

| EP | 2584480 | 4/2013 |
|----|---------|--------|
| WO | 2010/120421 | 10/2010 |

OTHER PUBLICATIONS

Chisvin L Et Al: "Content-addressable and 1-15 associative memory: alternatives to the ubiquitaus RAM", Computer, IEEE Computer Society, USA, vol. 22. No. 7, Jul. 1, 1989 (Jul. 1, 1989), pp. 51-64, XP011436720, ISSN: 0018-9162, DOI: 10.1109/2.30732.
(Continued)

*Primary Examiner* — Hung D Le
(74) *Attorney, Agent, or Firm* — Fish & Richardson P.C.

(57) ABSTRACT

Methods, systems, and apparatus, including computer programs encoded on a computer storage medium, for a system to create and employ associative memory maps for analysis of security file and/or logs are disclosed. In one aspect, a method includes the actions of receiving, from an external application, a request for a recommended action; extracting information regarding the entities and relationships between the entities from a data source; constructing an associative memory map from the extracted information; selecting a subgraph from the associative memory map based on a result of employing a vector to search nodes in the associative memory map; identifying the nodes most relevant to the requested recommend action base on a shortest paths of traversal in the selected subgraph of nodes; determining the requested recommended action based on an event identified in the relationships between the identified most relevant nodes; and transmitting the recommended action to the external application.

20 Claims, 7 Drawing Sheets

(51) Int. Cl.
    *G06F 16/38*     (2019.01)
    *G06F 16/36*     (2019.01)
    *G06F 16/23*     (2019.01)
    *G06F 16/33*     (2019.01)
    *G06F 16/901*     (2019.01)
    *G06F 21/62*     (2013.01)

(52) U.S. Cl.
    CPC ............ *G06F 16/367* (2019.01); *G06F 16/38* (2019.01); *G06F 16/9024* (2019.01); *G06F 21/6227* (2013.01)

(56) References Cited

U.S. PATENT DOCUMENTS

| | | |
|---|---|---|
| 2004/0083232 A1 | 4/2004 | Ronnewinkel et al. |
| 2004/0170172 A1* | 9/2004 | Pullela ............... G06F 16/90339 370/392 |
| 2008/0313143 A1 | 12/2008 | Warn et al. |
| 2013/0080448 A1 | 3/2013 | Arnold et al. |
| 2015/0058527 A1* | 2/2015 | Venkata ............... G06F 12/0873 711/103 |

OTHER PUBLICATIONS

European Search Report and written opinion in Application No. 18206126.7, dated Jan. 11, 2019, 10 pages.

\* cited by examiner

COGNITIVE DECISION SYSTEM FOR SECURITY AND LOG ANALYSIS USING ASSOCIATIVE MEMORY MAPPING IN GRAPH DATABASE

CROSS-REFERENCE TO RELATED APPLICATION

This application claims priority to Indian Patent Application No. 201711043445, filed on Dec. 4, 2017, entitled "Cognitive Decision System for Security and Log Analysis Using Associative Memory Mapping in Graph Database," the entirety of which is hereby incorporated by reference.

BACKGROUND

In database systems, an associative model for data is a data-based model. Other data models, such as a relational model and an object data model are record-based models. Associative models may encompass attributes about an element that has a discrete independent existence. Such elements can be described as a thing (e.g., a car) in a record structure. For example, within the context of a car, attributes may include registration, color, make, model, and so forth. Additionally, in an associative model, "things" can be modeled as nodes and relationships between these nodes modeled as associations. The nodes and relationships between them form, for example, an associative memory map or memory graph.

SUMMARY

Implementations of the present disclosure are generally directed to the creation and employment of associative memory maps for analysis of security file and/or logs. More specifically, implementations are directed to a system that receives a request for event information regarding the relationship(s) between various entities that use a particular system or application. The described system constructs an associative memory maps from various sources where data of the particular system or application is persisted. The described system determines events within the constructed associative memory maps relevant to the request.

In a general implementation, a system that includes: one or more processors; and a computer-readable storage device coupled to the one or more processors and having instructions stored thereon which, when executed by the one or more processors, cause the one or more processors to perform operations that include: receiving, from an external application, a request for a recommended action regarding entities associated with a source system. Information regarding the entities and relationships between the entities is extracted from a data source in which the source system persists transaction and security data. An associative memory map is constructed from the extracted information. The associative memory map describes the entities as nodes and characterizes a strength of the relationships between each entity. A subgraph of nodes is selected from the associative memory map based on a result of employing a vector to search the nodes in the associative memory map. The vector havened been generated based on the requested recommended action. The nodes most relevant to the requested recommend action are identified base on a shortest paths of traversal in the selected subgraph of nodes. The requested recommended action is determined based on an event identified in the relationships between the identified most relevant nodes. The recommended action is transmitted to the external application.

In another general implementation, a computer-implemented method executed by one or more processors, the method includes: receiving, from an external application, a request for a recommended action regarding entities associated with a source system. Information regarding the entities and relationships between the entities is extracted from a data source in which the source system persists transaction and security data. An associative memory map is constructed from the extracted information. The associative memory map describes the entities as nodes and characterizes a strength of the relationships between each entity. A subgraph of nodes is selected from the associative memory map based on a result of employing a vector to search the nodes in the associative memory map. The vector havened been generated based on the requested recommended action. The nodes most relevant to the requested recommend action are identified base on a shortest paths of traversal in the selected subgraph of nodes. The requested recommended action is determined based on an event identified in the relationships between the identified most relevant nodes. The recommended action is transmitted to the external application.

In yet another general implementation, One or more non-transitory computer-readable storage media coupled to one or more processors and having instructions stored thereon which, when executed by the one or more processors, cause the one or more processors to perform operations that include: receiving, from an external application, a request for a recommended action regarding entities associated with a source system. Information regarding the entities and relationships between the entities is extracted from a data source in which the source system persists transaction and security data. An associative memory map is constructed from the extracted information. The associative memory map describes the entities as nodes and characterizes a strength of the relationships between each entity. A subgraph of nodes is selected from the associative memory map based on a result of employing a vector to search the nodes in the associative memory map. The vector havened been generated based on the requested recommended action. The nodes most relevant to the requested recommend action are identified base on a shortest paths of traversal in the selected subgraph of nodes. The requested recommended action is determined based on an event identified in the relationships between the identified most relevant nodes. The recommended action is transmitted to the external application.

In an aspect combinable with any of the general implementations, the associative memory map is constructed based on ontologies identified based on an analysis of metadata from the transaction and security data.

In another aspect combinable with any of the previous aspects, the data source comprises a relational database management system (RDBMS) and the transaction and security data is stored in a relational model.

Another aspect combinable with any of the previous aspects, where extracting information regarding the entities and the relationships between the entities includes retailing the information from the RDBMS and employing a graph mappings using key constrains from columns in RDBMS.

In another aspect combinable with any of the previous aspects, the data source comprises structured files and the transaction and security data is stored in fixed fields within a record or file.

In another aspect combinable with any of the previous aspects, the data source comprises text and log files and the transaction and security data is stored as unstructured data.

In another aspect combinable with any of the previous aspects, where extracting information regarding the entities and the relationships between the entities includes natural language processing (NLP) and regular expression analysis of the stored unstructured data.

In another aspect combinable with any of the previous aspects, the data source comprises audio or video files, and wherein extracting information regarding the entities and the relationships between the entities includes an analysis of metadata of the audio or video files.

In another aspect combinable with any of the previous aspects, the event comprises a high threshold event, a rare relationship event, a rare node and relationship event, or an unusual pattern event.

In another aspect combinable with any of the previous aspects, further including transmitting the event to the external application.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
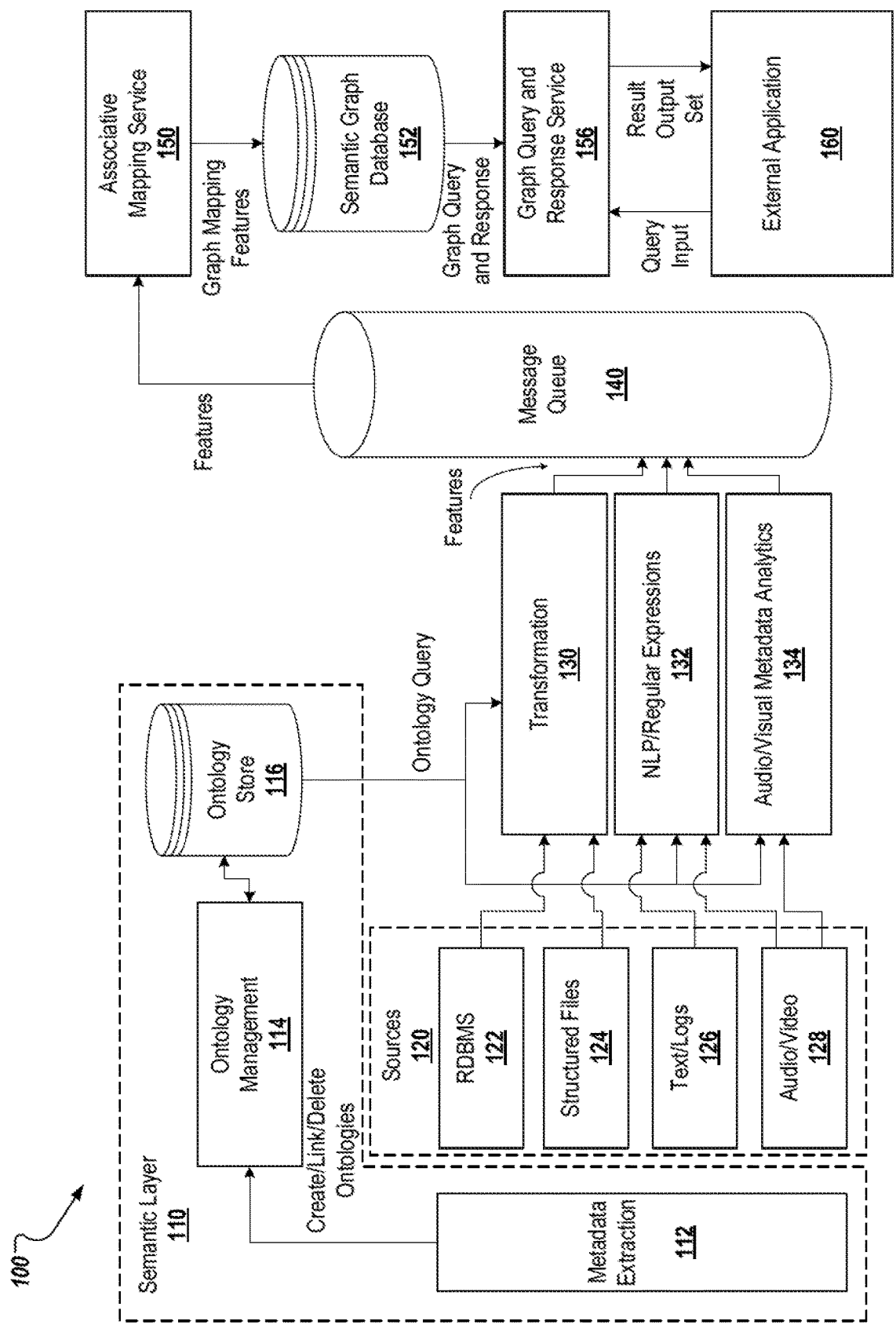
FIG. 1 depicts a logical architecture for the associative memory mapping from multiple sources.

Associative memory maps have been increasingly employed for the characterization of complex relationships to determine complex patterns and events between nodes. For example, associative memory maps may be employed in the implementation of high performance computing architectures for applications that require intensive data management and/or are cognitive in nature. Moreover, associative memory maps, when implemented using a graph database, can deliver great value for businesses entities when mining, for example, log and security information. Analysis of these associative memory maps allow such entities to glean insights and generate recommendations. For example, analysis of generated associative memory maps can help to generate answers to questions in a few seconds just like a human brain and can scale as much as any NoSQL graph database. Furthermore, the use of such associative memory maps allows a system to uncover hidden insights from various, and often seemingly disjoint, domains.

In view of the foregoing, implementations of the present disclosure are generally directed to a system that employs associative memory maps. Such memory maps may be created from multiple sources. For example, the described system creates and employs associative memory maps in a manner that mimics how the human brain works in real time. Thus, the storage of information is in itself intelligent. Within the described system, this intelligence is tapped automatically during the ingestion of new information. The ability to create the intelligent storage can be achieved using associative memory maps on graph database technologies. For example, in some implementations, the described system may be employed to implement a scalable solution for generating insights from security logs that are fed to create an associative memory map. Such an associative memory map unifies recorded data and can be used to uncovered insights from determined associations. Implementations of the described system can be used to gather such insights into thousands or even millions of data points through the associates built through the respective associative memory maps.

The mapping of information within the described system takes into account the type and complexity of the information gathered for a source system and captures the strengths of identified relationships within the mapped data. The system architecture may be deployed through a series of models that are associated with various architectural system layers. In some implementations, potential transformations, employing metadata, can be extracted from relevant sources and mapped to appropriate ontologies. These ontologies can be referenced by various modules while transforming the source data. Once transformed and mapped, the information is "digested" in an associative memory mapped graph database. To extract information out of such a database, a set of input values may be entered and recommendations can be suggested based on these input values. In some implementations, the greater number of inputs proportionally affects the precision of the recommendations based on the mapped data. In some implementations, results from a graph reduction of the mapped data and an associative query may also be persisted. These may serve to alter the identified strengths between the various mapped entities and their corresponding relationships.

The described system may also be employed in other contexts. For example, associative memory maps can be employed by artificial intelligence (AI) engines to make recommendations. Moreover, associative memory maps can easily simulate a page ranking techniques for similar pages. For example, associative memory maps can be used by AI engines to recommend assets on web pages, shopping websites or blogs, and/or to making recommendations for a virtual assistant or chatbot. Such rankings can be based on, for example, an input of nodes that is related to the recommendations that are required to be extracted. Furthermore, associative memory maps of image Uniform Resource Identifiers (URIs) and elaborate tags can be employed for analysis and recommendation of similar or relevant images. Associative memory maps may also be employed in cognitive computing. As an example, they may be used to capture various events and, based on the likelihood of events, provide response selections for a corresponding event. Additionally, associative memory maps may be used to capture various associations in a transaction dataset, log, or ledger to create a visual representation of the strengths among various users who transact with one another. Other uses for associative memory maps are also envisioned.

FIG. 1 depicts a logical architecture 100 for the associative memory mapping from multiple sources. The logical architecture 100 includes a semantic layer 110, various sources of information 120, transformation module 130, NLP and regular expression module 132, audio and visual metadata analytics module 134, message queue repository 140, associative mapping service module 150, semantic graph database 152, graph query and response service module 156, and extremal application(s) 160. The semantic layer 110 includes metadata extraction and ontology detection module 112, ontology management module 114, and ontology data store 116. Ontology store 116, message queue repository 140, and semantic graph database 152 may be a relational database, such as Oracle™, DB2™, Structured Query Language (SQL) Server, Titan™ Database, Neo4J™, Datastax Graph™, and so forth, implemented on an enterprise database server or virtual server. The example architecture may be provided using one or more computing device(s) of any suitable number and type of computing device. Configurations of such computing devices include shared, virtual, managed/dedicated, cluster/grid, cloud based resources, and/or any combination thereof.

The metadata extraction and ontology detection module 112 analyzes the metadata from the various sources 120, such as RDBMS 122, structured files 124, text and logs 126, and audio and visual files 128. Sources 120 are where, for example, transaction and security data from a system or application are persisted. The metadata extraction and ontology detection module 112 maps the data types and column types to a set of pre-defined ontologies. Such ontologies may be created and updated by a system administrator. RDBMS 122 are a database management system that is based on the relational model. Structured files 124 are data that resides in fixed fields within a record or file. Such data may be included in relational databases and/or spreadsheets.

Ontology management module 114 focuses on the creation, deletion, modification, and visualization of ontologies determined from the data received from the metadata extraction and ontology detection module 112. For example, the ontology management module 114 creates or imports domain specific ontologies to produce rich data associations between the various nodes within each ontology. Once the ontologies have been constructed, the information may be stored in ontology store 116.

The transformation module 130 transforms the source data from the RDBMS 122 and the structured files 124 and applies the ontologies generated and stored in ontology store 116 to fit into an associative mapping. In some implementations, the transformation module 130 may employ an entity based approached or a data element based approach to perform the mapping. An entity based approach retains the information from the available RDBMS 122 and employs graph mappings using the key constrains from, for example, the columns in RDBMS 122. Such key columns are then used to ingest the remaining table columns. Key columns may also be used to link table information to one other. The entity based approach is useful if an entity employing the described associative memory mapping wants to, for example, retain the RDBMS 122 constraint information in an associative memory map for later reference. A data element based approach does not take into consideration key constraints. Instead, data is inserted at a data element level, and if the data element or the relationship exists at the time of insertion into the graph then the strength of the node or relationship is increased. This approach is useful in uncovering hidden patterns.

NLP and regular expression module 132 extracts information from the unstructured text and logs 126 and maps the information according to ontologies from the ontology store 116. The results are stored in an associative memory mapped graph. In some example, NLP includes the ability of a computer program or software to understand human speech as it is spoken or written. For example, NLP makes it possible for an artificial intelligence program, such as employed within NLP and regular expression module 132, to receive conversational or text input, such as from the text and log 126 and the audio and video input 128. NLP and regular expression module 132 breaks down the respective syntax to determine the input's meaning and/or determine an appropriate action.

The audio and visual metadata analytics module 134 analyzes the metadata from audio or video sources 128. Example from audio or video sources 128 may include tags on the audio or video file. These tags are extracted by the audio and visual metadata analytics module 134 and transformed based on ontologies from the ontology store 116. Once transformed based on the appropriate ontology, the information can be ingested into an associative memory mapped graph. Once the information extracted from the sources 120 have been transformed and mapped to a respective graph based on the ontology information in the ontology store 116 by the transformation module 130, the NLP and regular expression module 132, or the audio and visual metadata analytics module 134, the graph information is stored in the message queue repository 140. The message queue repository 140 may be employed within the example system 100 as an ingestion point for data. In some implementations, the message queue repository 140 is run asynchronously to reduce inherent slowness in the create associative memory maps as a dataset grows The associative mapping service module 150 creates vertices and edges in the graphs stored in the message queue repository 140. Additionally, the associative mapping service module 150 calculates and updates the strength of all vertices and edges for each graph that is processed by the module. If the incoming information is present in a map, then the associative mapping service module 150 registers that this information has been encountered again. Registration may be done using status on the nodes in a particular graph, which allows that registration of the strength of the relation of co-occurring events in a particular mapped graph. Once processed by associative mapping service module 150, semantic graph information is stored in the semantic graph database 152.

The graph query and response service module 156 receives multiple inputs from the external application(s) 160. The inputs may request, for example, a recommended action based on the relationships between nodes or entities using a particular system and the strengths of each relationship. The graph query and response service module 156 makes recommendation and/or takes actions based on the received input and queries performed on the semantic graph database 152. In some implementations, the graph query and response service module 156 queries to find the best or similarly matched relationships. Results from graph ingestion may be updated in the information stored in the semantic graph databased 152 for future results. The external application(s) 160 include various applications and software deployed within an entity that is employing the described associative memory mapping system.

Figure 2A:
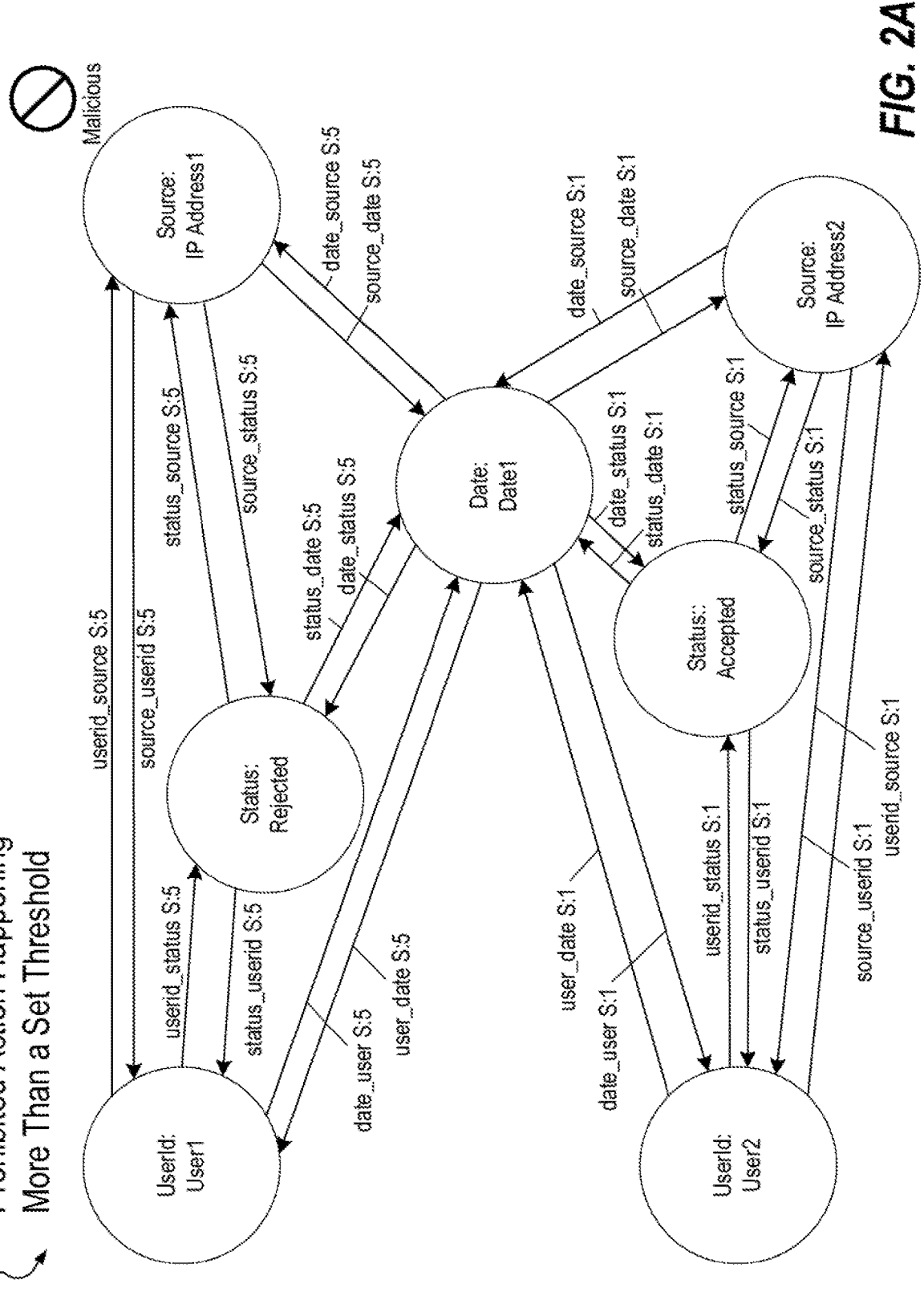
FIGS. 2A-C depict example associative memory maps.

FIG. 2A depicts an example associative memory map 200. The example memory map 200 depicts a memory map created from parsed log file information. The depicted memory map 200 shows how a threshold can detect a malicious traffic source in network. The depicted memory map 200 shows a prohibited action may happen when a set threshold is reached. The depicted example map shows five or more rejected logins in a day from a particular user (user 1). This information may indicate that a network source is trying to impersonate a user, which may indicate that the attempted logins are malicious.

Figure 2B:
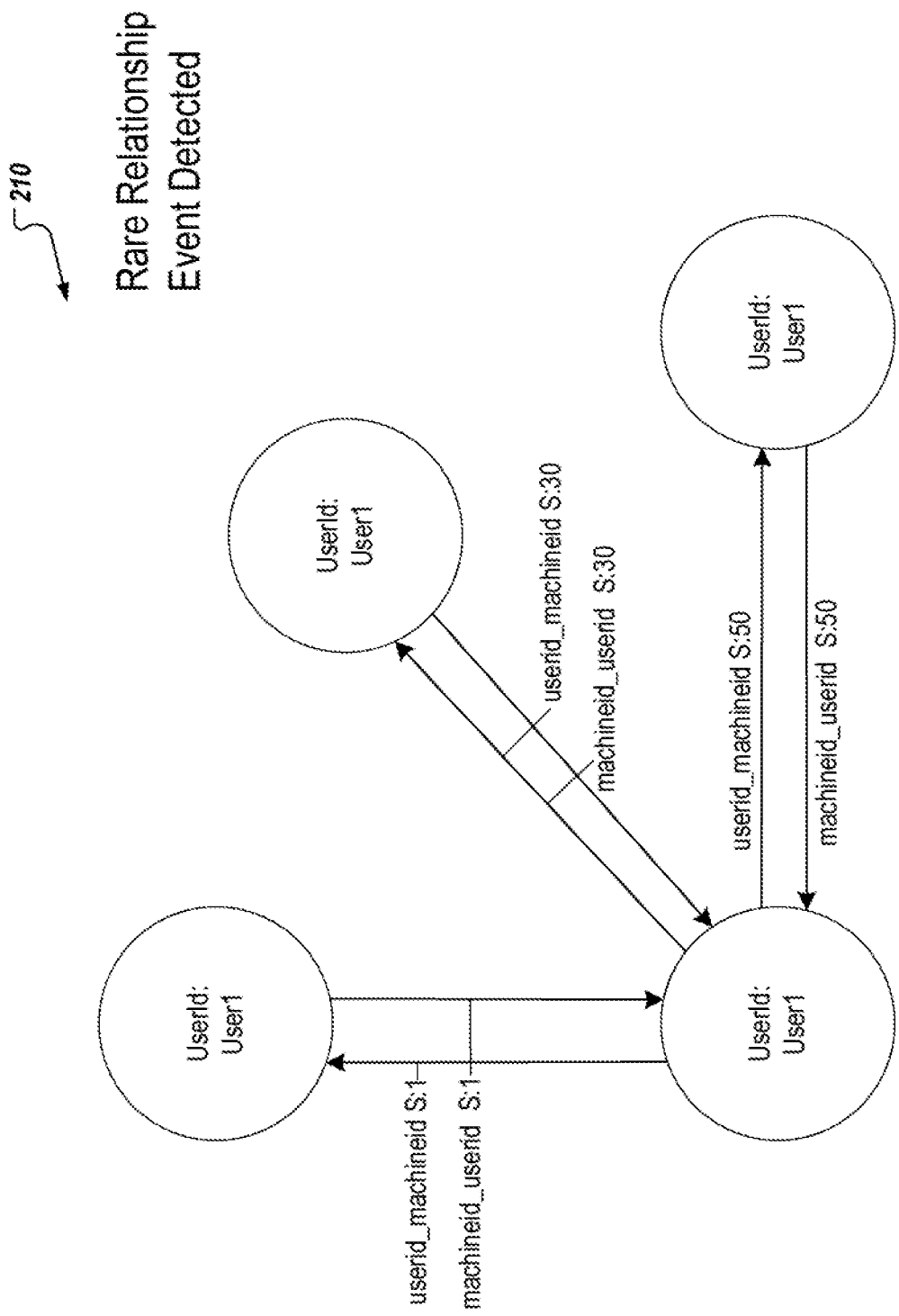

FIG. 2B depicts an example associative memory map 210. The depicted memory map 210 shows how a rare activity can be detected using the strength of relationships within a memory map. The depicted memory map 210 shows a user trying to do a rare activity, which can be determined based on patterns that are subjected to auditing. As shown, logs from multiple machines may be employed to build the memory map, which may be used to extract a rare action for a particular entity.

Figure 2C:
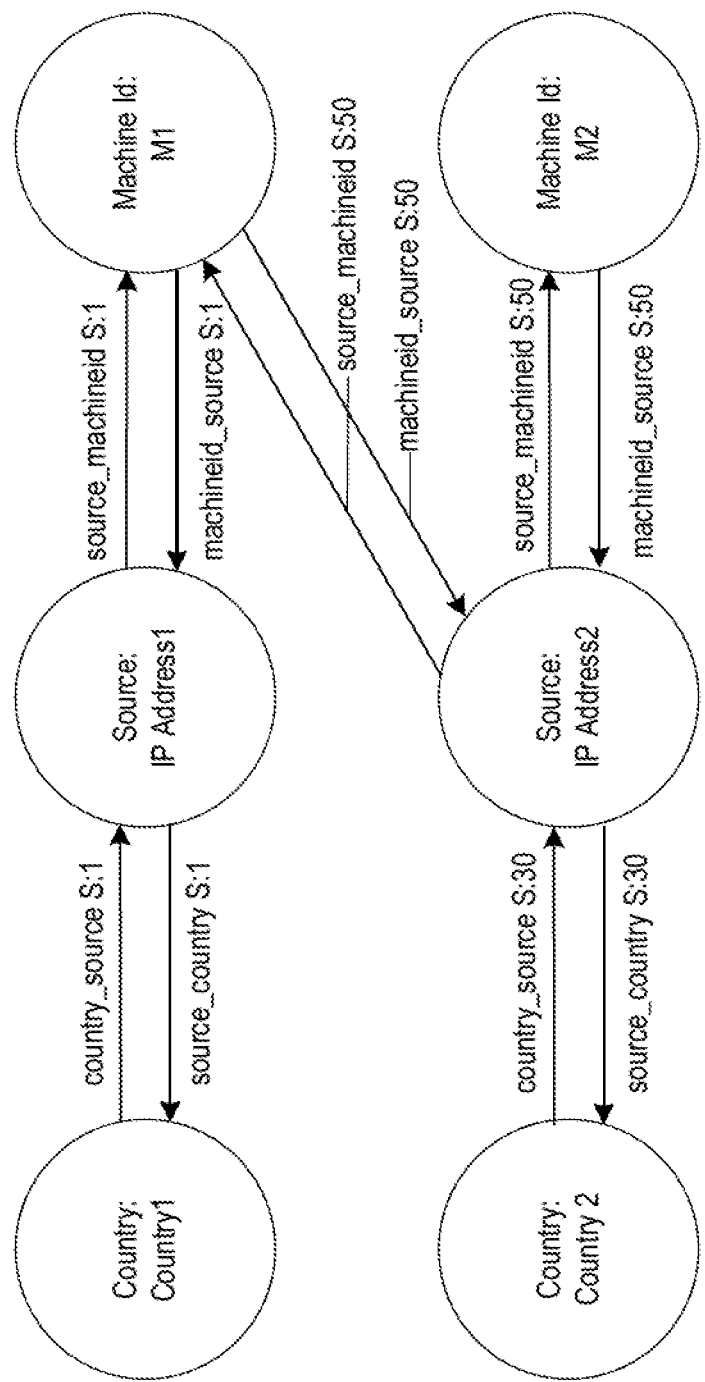

FIG. 2C depicts an example associative memory map 220. The depicted memory map 220 shows how an unusual traffic source can be detected by looking at newly created nodes and relationships. The depicted memory map 220 shows unusual traffic coming from a distant geography based on source Internet Protocol (IP) address. The depicted map show that custom geography can be classified as ontology (e.g., IPs belonging to particular Office/facility). For generic geography information, and geolocation service can be used to detect sources of an IP address. The depicted map 220 was created using logs, but other sources of information may provide similar information. The memory map 220 shows, for example, unusual traffic to the machines 1 and 2 depicted in the map.

Figure 3:
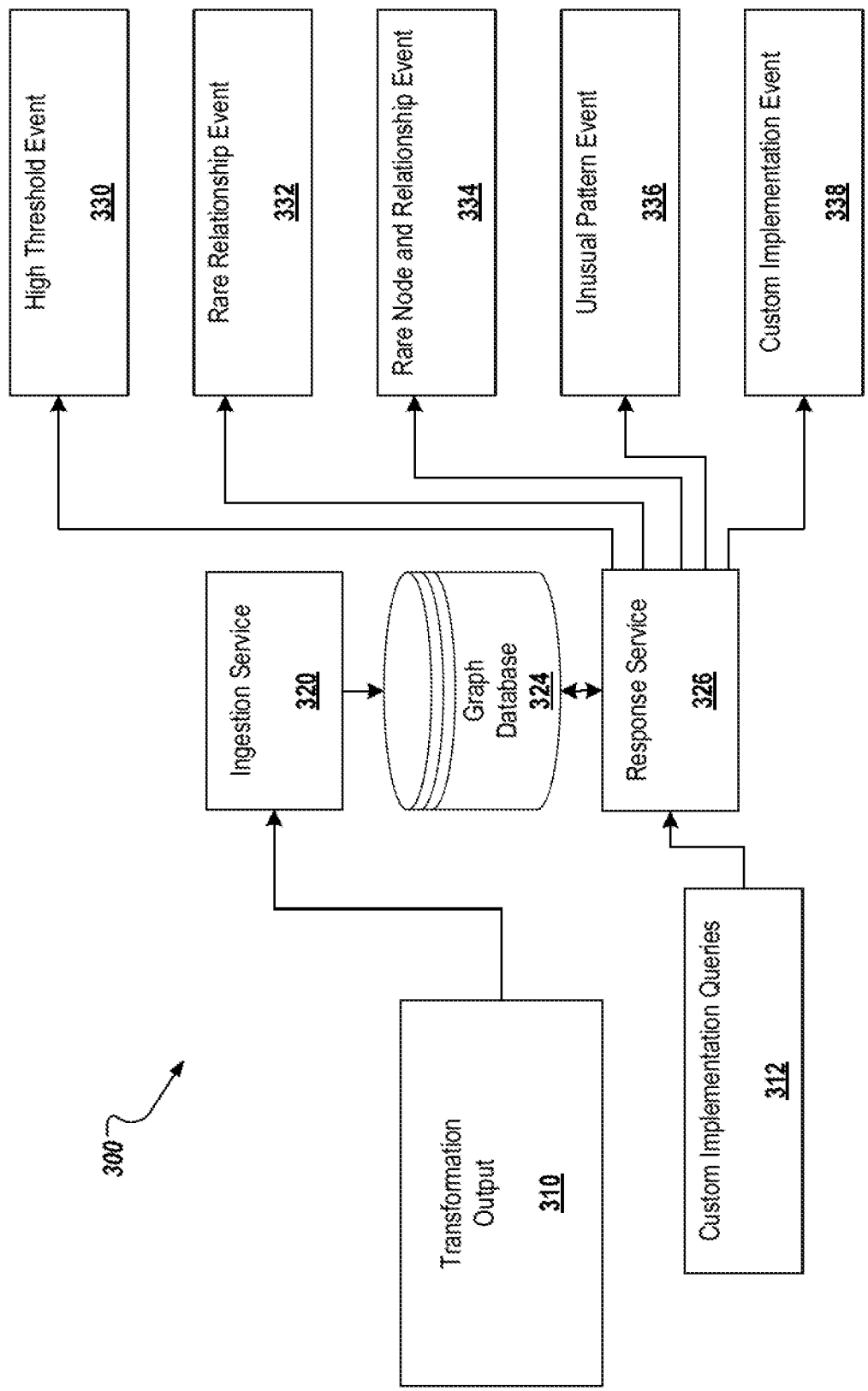
FIG. 3 depicts an example system for generating the various types of responses that may be determined from an associative memory map.

FIG. 3 depicts an example system 300 for generating the various types of responses that can be determined from an associative memory map. The example 300 includes transformation output 310, custom implementation queries 212, integration services 320, graph database 324, response service 326, and the types of responses: high threshold event 330, rare relationship event 332, rare node and relationship event 334, unusual pattern event 336, and custom implementation event 338. Transformation output 310 is substantially similar to the semantic layer 110 of FIG. 1 and represents the information extracted to the ontology store 116 as well as the information from the sources 120. Ingestions services 310 represent the transformation module 130, the NLP and regular expression module 132, the audio and visual metadata analytics module 134 and the associative mapping service 150 from FIG. 1. Graph database 324 is substantially similar to semantics graph database 152, and response service 326 is substantially similar to graph query and response service 156 of FIG. 1.

In the depicted example system 300, the transformation output 310 is received by ingestion service 320 and mapped into a memory map, which is stored in graph database 324. Response service 326 determines the event: high threshold event 330, rare relationship event 332, rare node and relationship event 334, and unusual pattern event 336, based on the information contained in the memory maps persisted in the graph database. Additionally, response service 326 may employ custom implementation queries 312 to query the graph database. Custom queries 212 allows user of the example system 300 to customize searches based on relevant data points and/or graph nodes and the mapped relationships between the nodes. For example, a determined memory map may show that a particular node X is related to a different node Y, which is related to yet another node U. A custom query 312 may define a query that looks for this particular pattern in other areas of the mapped based on related factors, which may be entered by a used of the example system 300. The results of custom queries 312 are provide by the response service 326 as custom implementation events 338.

In some implementations, the response service 326 generates a vector to search a set of nodes in a particular memory map. A subgraph is selected of the relevant nodes based on the input parameters. The response service 326 notes any vertices and edges in the shortest path(s) of traversal and find similar vertices and edges by performing a full search on the associative memory map. Results are retuned to, for example, the external application(s) 160 of FIG. 1 in order of strength of the relevant nodes. For example, based on an analysis of a log file, the server(s) that a user typically logs in to access an application may be discovered. The response service 326 may extract this information based on the graph patterns and strength of relationships represented by the respective constructed memory map.

Various types of events can be determined from the constructed memory maps. In the depicted example system 300, four types are shown; however, other types of event may be determinable. High threshold event 330 is an event that reflects a plethora of a certain type of event within a memory map. Such a plethora of a certain event might show, for example, a potential brute force attack on a server or application. Rare relationship event 332 is an event that is shown to not happen often (often being determine based on the context and/or a configured threshold value). For example, a rare relationship event may be shown when a user accesses a resource never before accessed by that particular user. Rare node and relationship event 334 may show both a rare event coupled by an action taken by a rare node. For example, when web traffic is received from a new geographic location accessing a little or seldom used feature of a monitored system. Unusual pattern event 336 is an event that is outside of normal behavior for the system of, for example, various node or programs that may access the system. For example, when a user accessed a resource a number of times and/or at an hour of day atypically for other users accessing the system. When such events are detected, the response service 326 can take suitable actions on detection of these and other patterns.

Figure 4:
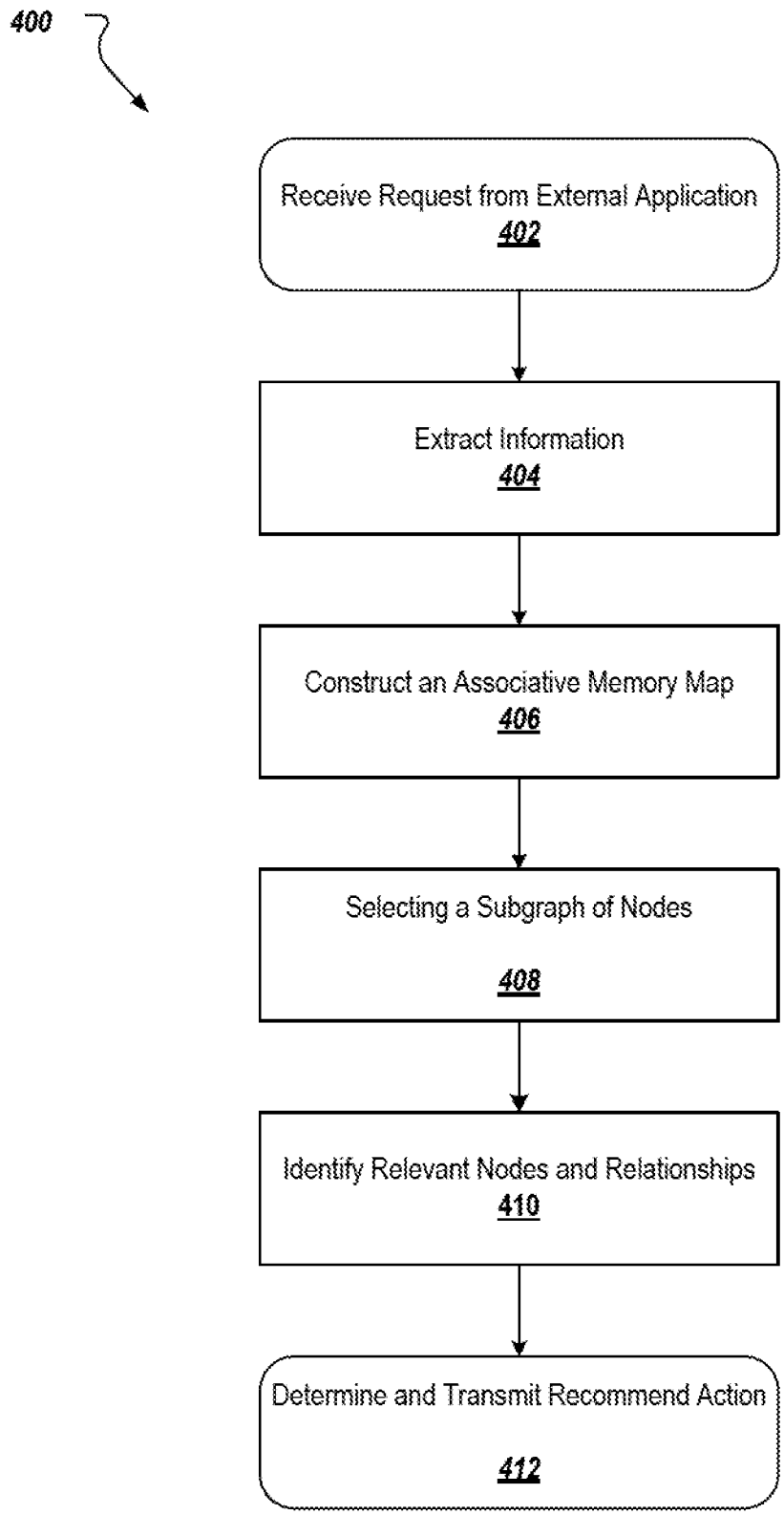
FIG. 4 depicts a flow diagram of an example process used within a system employing an associative memory map to determine and transmit discovered events.

FIG. 4 depicts a flow diagram of an example process (400) used within a system employing an associative memory map, such as example architecture 100 and example system 300, to determine and transmit discovered events. The described system receives (402) a request from an external application for a recommended action regarding, for example, the relationships and events related to entities using a particular application or related system. An ingestion service extracts (402) information from a data source from the particular application or related system, such as RBDMS 122, structured files 124, text and log files 126, and audio and visual files 128. The ingestion service extracts the relevant information regarding various entities identified within the information obtained from the various data sources. The information may be extracted by a transformation module 130, which transforms structured information; NLP and a regular expression module 132, which extracts unstructured information from, for example, text and log files; and an audio and visual metadata analytics module 134, which analyzes the metadata from audio or video sources. An associative mapping service constructs (406) an associative memory map based on the extracted information and ontologies built and/or selected based on the metadata from the various sources. A graph query and response service selects (408) a subgraph of nodes from the associative memory map based on a result of employing a vector to search the nodes in the associative memory map. In some implementations, the vector is generated based on the requested recommended action. The graph query and response service identifies (410) the nodes most relevant to the requested recommend action base on a shortest paths of traversal in the selected subgraph of nodes. The described system transmits (412) to the external application the recommended action determined based on an event identified in the relationships between the identified most relevant nodes. Such an event may include a high threshold event, a rare relationship event, a rare node and relationship event, and/or an unusual pattern event as described in detail above.

Figure 5:
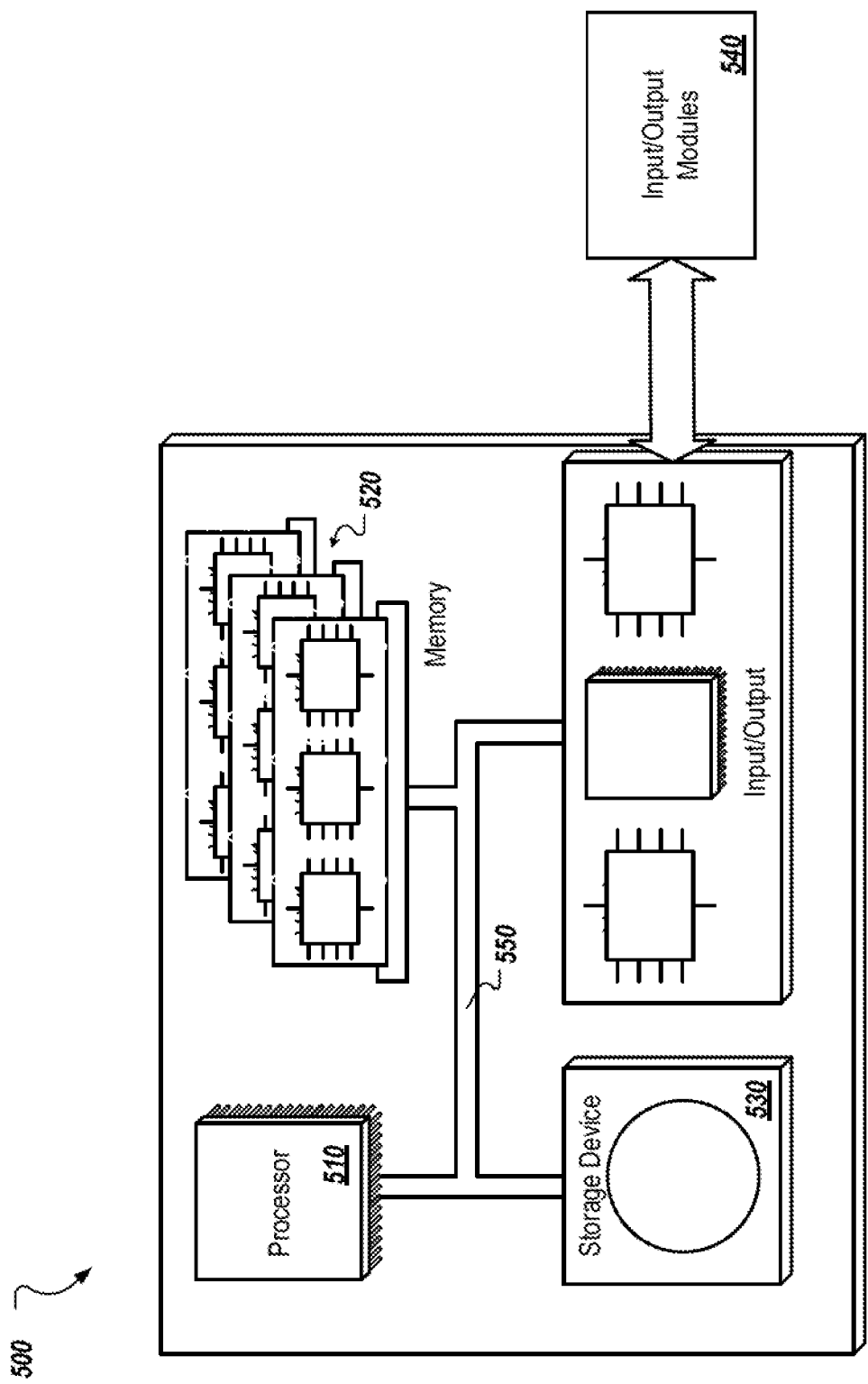
FIG. 5 depicts a schematic diagram of an example computer system.

FIG. 5 is a schematic diagram of an example computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally, the system can include portable storage media, such as Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510 (e.g., processor 213), a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc-read only memory (DVD-ROM) disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network (LAN), a wide area network (WAN), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising;
   receiving, from an external application, a request for a recommended action regarding entities associated with a source system;
   extracting information regarding the entities and relationships between the entities from a data source in which the source system persists transaction and security data;
   constructing an associative memory map from the extracted information, wherein the associative memory map describes the entities as nodes and characterizes a strength of the relationships between each entity;
   selecting a subgraph of nodes from the associative memory map based on a result of employing a vector to search the nodes in the associative memory map, the vector generated based on the requested recommended action;
   identifying the nodes most relevant to the requested recommended action based on a shortest paths of traversal in the selected subgraph of nodes;
   determining the requested recommended action based on an event identified in the relationships between the identified most relevant nodes; and
   transmitting the recommended action to the external application.

2. The method of claim 1, wherein the associative memory map is constructed based ontologies identified based on an analysis of metadata from the transaction and security data.

3. The method of claim 1, wherein the data source comprises a relational database management system (RDBMS) and the transaction and security data is stored in a relational model.

4. The method of claim 3, wherein extracting information regarding the entities and the relationships between the entities includes retailing the information from the RDBMS and employing a graph mappings using key constrains from columns in RDBMS.

5. The method of claim 1, wherein the data source comprises structured files and the transaction and security data is stored in fixed fields within a record or file.

6. The method of claim 1, wherein the data source comprises text and log tiles and the transaction and security data is stored as unstructured data.

7. The method of claim 6, wherein extracting information regarding the entities and the relationships between the entities includes natural language processing (NLP) and regular expression analysis of the stored unstructured data.

8. The method of claim 1, wherein the data source comprises audio tiles or video files, and wherein extracting information regarding the entities and the relationships between the entities includes an analysis of metadata of the audio tiles or the video files.

9. The method of claim 1, wherein the event comprises a high threshold event, a rare relationship event, a rase node and relationship event, or an unusual pattern event.

10. The method of claim 1, further comprising:
    transmitting the event to the external application.

11. One or more non-transitory computer-readable storage media coupled to one or more processors and having instructions stored thereon which, when executed by the one or more processors, cause the one or more processors to perform operations comprising:
    receiving, from an external application, a request for a recommended action regarding entities associated with a source system;
    extracting information regarding the entities and relationships between the entities from a data source in which the source system persists transaction and security data;
    constructing an associative memory map from the extracted information, wherein the associative memory map describes the entities as nodes and characterizes a strength of the relationships between each entity;
    selecting a subgraph of nodes from the associative memory map based on a result of employing a vector to search the nodes in the associative memory map, the vector generated based on the requested recommended action;

identifying the nodes most relevant to the requested recommended action based on a shortest paths of traversal in the selected subgraph of nodes;

determining the requested recommended action based on an event identified in the relationships between the identified most relevant nodes; and transmitting the recommended action to the external application.

12. The one or more non-transitory computer-readable storage media of claim 11, wherein the associative memory map is constructed based on ontologies identified based on an analysis of metadata from the transaction and security data.

13. The one or more non-transitory computer-readable storage media of claim 11, wherein the data source comprises a relational database management system (RDBMS) and the transaction and security data is stored in a relational model.

14. The one or more non-transitory computer-readable storage media of claim 13, wherein extracting information regarding the entities and the relationships between the entities includes retailing the intbrmation from the RDBMS and employing a graph mappings using key constrains from columns in RDBMS.

15. The one or more non-transitory computer-readable storage media of claim 11, wherein the data source comprises structured files and the transaction and security data is stored in fixed fields within a record or file.

16. A system comprising:
one or more processors; and
a computer-readable storage device coupled to the one or more processors and having instructions stored thereon which, when executed by the one or more processors, cause the one or more processors to perform operations comprising:
receiving, from an external application, a request for a recommended action regarding entities associated with a source system;
extracting information regarding the entities and relationships between the entities from a data source in which the source system persists transaction and security data;
constructing an associative memory map from the extracted information, wherein the associative memory map describes the entities as nodes and characterizes a strength of the relationships between each entity;
selecting a subgraph of nodes from the associative memory map based on a result of employing a vector to search the nodes in the associative memory map, the vector generated based on the requested recommended action;
identifying the nodes most relevant to the requested recommended action based on a shortest paths of traversal in the selected subgraph of nodes;
determining the requested recommended action based on an event identified in the relationships between the identified most relevant nodes; and
transmitting the recommended action to the external application.

17. The system of claim 16, wherein the data source comprises audio files or video files, and wherein extracting information regarding the entities and the relationships between the entities includes an analysis of metadata of the audio files or the video files.

18. The system of claim 16, wherein the transaction and security data are stored as records of captured sound or digital video that can be played back, wherein each record of captured sound or digital video is extracted from a respective audio or visual file.

19. The system of claim 18, wherein the event comprises a high threshold event, a rare relationship event, a rare node and relationship event, or an unusual pattern event.

20. The system of claim 19, the operations further comprising:
transmitting the event to the external application.

* * * * *

UNITED STATES PATENT AND TRADEMARK OFFICE
CERTIFICATE OF CORRECTION

PATENT NO. : 10,817,545 B2
APPLICATION NO. : 16/119461
DATED : October 27, 2020
INVENTOR(S) : Sudhir Ranganna Patavardhan and Nikhil S. Tanwar It is certified that error appears in the above-identified patent and that said Letters Patent is hereby corrected as shown below:

In the Claims

Column 11, Line 59, Claim 1, delete "comprising;" and insert -- comprising: --, therefor.

Column 12, Line 18, Claim 2, after "based" insert -- on --.

Column 12, Line 34, Claim 6, delete "tiles" and insert -- files --, therefor.

Column 12, Line 42, Claim 8, delete "tiles" and insert -- files --, therefor.

Column 12, Line 45, Claim 8, delete "tiles" and insert -- files --, therefor.

Column 12, Line 47, Claim 9, delete "rase" and insert -- rare --, therefor.

Column 13, Line 24, Claim 14, delete "intbrmation" and insert -- information --, therefor.

Column 13, Line 31, Claim 16, delete "system" and insert -- system, --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*